(12) United States Patent
Yu

(10) Patent No.: US 6,942,714 B2
(45) Date of Patent: Sep. 13, 2005

(54) NANO DIATOMITE AND ZEOLITE CERAMIC CRYSTAL POWDER

(75) Inventor: Eukki Qi Yu, City of Industry, CA (US)

(73) Assignee: Misty Li-Ming Chang, City of Industry, CA (US)

(*) Notice: Subject to any disclaimer, the term of this patent is extended or adjusted under 35 U.S.C. 154(b) by 106 days.

(21) Appl. No.: 10/351,518

(22) Filed: Jan. 27, 2003

(65) Prior Publication Data
US 2005/0115469 A1 Jun. 2, 2005

(51) Int. Cl.$^7$ .............................................. C05C 1/00
(52) U.S. Cl. .............................. 71/62; 71/63; 106/900; 47/62 N; 47/58.1 C; 47/DIG. 10
(58) Field of Search ...................... 71/62, 63; 106/900; 47/62 N, 58.1 SC, DIG. 10, 58.1 C

(56) References Cited

U.S. PATENT DOCUMENTS

| | | | | |
|---|---|---|---|---|
| 4,986,989 A | * | 1/1991 | Sirosita et al. | 424/635 |
| 5,725,630 A | * | 3/1998 | Roberts et al. | 71/11 |
| 5,782,951 A | * | 7/1998 | Aylen et al. | 71/28 |
| 6,277,167 B1 | * | 8/2001 | Ito et al. | 71/6 |

* cited by examiner

*Primary Examiner*—Paul Marcantoni
(74) *Attorney, Agent, or Firm*—Raymond Y. Chan; David and Raymond

(57) ABSTRACT

A nano diatomite and zeolite ceramic crystal powder which is a new environmental material made by combining high-quality natural diatomite and zeolite together and by using most advanced nano technology, wherein the ceramic crystal powder has the capability of producing great benefits for society through advances in health care, a cleaner environment, and agriculture.

7 Claims, 2 Drawing Sheets

NANO DIATOMITE AND ZEOLITE CERAMIC CRYSTAL POWDER

BACKGROUND OF THE PRESENT INVENTION

1. Field of Invention

The present invention relates to a nano diatomite and zeolite ceramic crystal powder which is a new environmental material made by combining high-quality natural diatomite and zeolite together and by using most advanced nano technology, wherein the ceramic crystal powder has the capability of producing great benefits for society through advances in health care, a cleaner environment, and agriculture.

2. Description of Related Arts

It is known that plant and grass need water and nutrients to grow. Generally speaking, in order to increase crop yield, an individual must periodically water and supply the nutrient the plant. In addition, the soil is one of the most important factors in the cultivation because the soil must retain the water to maintain a certain moisture level for the plant and prevent the nutrient loss from leaching and improve plant health and growth.

According to nowadays technology, the agricultural workers would like to put a water retention material in the soil such that the water and nutrient can be retained in the soil. However, since the soil cannot absorb the water, the microbial contaminants, such as bacteria, viruses, or protozoa, may able to grow in soil. Such microbial contaminants not only produce bad odor but also damage the root of the plant. Therefore, the cultivator may merely put some chemical substance, such as DDT or other pesticide, in the soil to kill the microbial contaminants. Even through such chemical substance can substantially kill the microbial contaminants to reduce the bad odor, the chemical substance damage the plant and pollute the soil.

The above example indicates that people use more and more chemical substance for improving their life styles. For instance, air/water filtration system, odor control system, and decontamination system contain chemical substance which may hazard to your health while daily use. Thus, the service life for such chemical substance is short that the user must exchange or replace the chemical substance periodically to maintain the system works at an optimum condition, which may highly increase the maintaining cost of the system.

SUMMARY OF THE PRESENT INVENTION

A main object of the present invention is to provide a nano diatomite and zeolite ceramic crystal powder which is a new environmental material made by combining high-quality natural diatomite and zeolite together and by using most advanced nano technology, wherein the ceramic crystal powder has the capability of producing great benefits for society through advances in health care, a cleaner environment, and agriculture.

Another object of the present invention is to provide a nano diatomite and zeolite ceramic crystal powder, which combine two ideally natural environmental materials of the diatomite and zeolite to form into a ceramic crystal that remains the porosity for more water retention, about 55% more water retention than other materials.

Another object of the present invention is to provide a nano diatomite and zeolite ceramic crystal powder, which improves the value and efficiency of fertilizers by its controlled holding and slow release process of nitrogen and phosphorus since the ceramic crystal powder of the present invention can absorb nitrogen and phosphorous in the air and then combining with water to release the nutrients gradually to the plant or grass.

Another object of the present invention is to provide a nano diatomite and zeolite ceramic crystal powder, which has the ion change capability to remove effluent toxins.

Another object of the present invention is to provide a nano diatomite and zeolite ceramic crystal powder, which can reduce nutrient loses from leaching and improve plant health and growth so as to increase crop yields.

Accordingly, in order to accomplish the above objects, the present invention provides a ceramic crystal powder, comprising powder of diatomite, powder of zeolite mixed with the diatomite.

These and other objectives, features, and advantages of the present invention will become apparent from the following detailed description, the accompanying drawings, and the appended claims.

DETAILED DESCRIPTION OF THE PREFERRED EMBODIMENT

Figure 1:
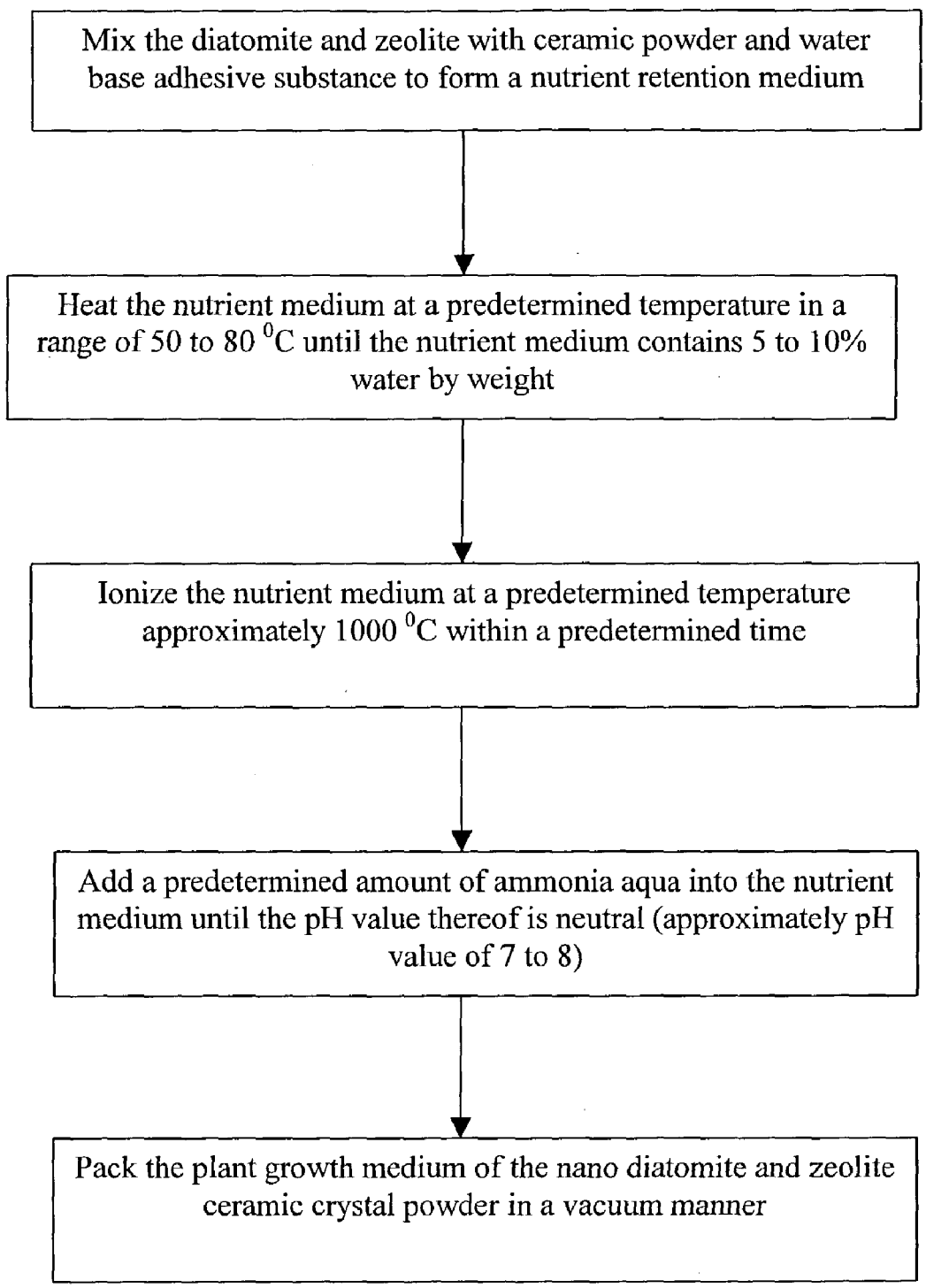
FIG. 1 is a flow diagram of manufacturing the nano diatomite and zeolite ceramic crystal powder as a plant growth medium according to a preferred embodiment of the present invention.

A ceramic crystal powder according to a preferred embodiment of the present invention is illustrated, wherein the ceramic crystal powder comprises powder of diatomite, powder of zeolite mixed with the diatomite.

Diatomite is a soft, chalk-like, sedimentary rock composed of the fossilized remains of microscopic aquatic plants, diatoms which are tiny plants that float near the ocean surface. Diatomite ($SiO_2.nH_2O$) is also known as diatomaceous earth or kieselguhr. Their skeletons are composed of silica (silicon dioxide), a very durable substance. Because diatomite consists of billions of little plant shells, it is chemically inert and highly absorbent (ability to absorb its own weight in liquid). In addition, since diatom skeletons are highly porous, diatomite is extremely light in weight, and pure samples make excellent water filters.

Filtration (including purification of beer, wine, liquors, oils, and grease) continued to be the largest end use for diatomite. Another application is the removal of microbial contaminants, such as bacteria, viruses, and protozoa, in public water system. Emerging small-scale applications for diatomite include pharmaceutical processing and use as a nontoxic insecticide.

Zeolites are natural volcanic minerals, which were formed when volcanic ash was deposited in ancient alkaline lakes. Zeolites are group of hydrated aluminosilicates of the alkali or alkaline earth metals that have a framework structure enclosing interconnected cavities occupied by large metal cations (positively charged ions)—principally sodium, potassium, magnesium and calcium—and water molecules. The ease of movement of ions and water within the framework allows reversible dehydration and cation exchange, properties that are exploited in water softeners and molecular sieves for pollution control, among other uses.

The Zeolite pores are microscopically small, and have molecular size dimensions such that they are often termed "molecular sieves". The size and shape of the pores (3-dimensional honeycomb/electro-magnetic sponge) have extraordinary effects on the properties of material for absorption processes. Zeolites are very resistant to the high doses of radiation present and are very selective ion exchangers, able to remove dangerous isotopes, which may be present in only minute concentrations and remove ammonia and ammonium ions. Zeolites can reduce the concentration by over 90% (enhances biological decomposition of organ compounds).

According to the research of Zeolites, they can be chemically modified and used for plant growth applications. Due to the ion exchangeability of the Zeolites with selected nutrient cations, Zeolites can become an excellent plant growth medium for supplying plant roots with additional vital nutrient cations and anions. The nutrients are provided in a slow-release, plant root demand-driven fashion through the process of dissolution and ion exchange reactions. The absorption of nutrients from the soil solution by plant roots drives the dissolution and ion exchange reactions, pulling away nutrients as needed. The Zeolite is then "recharged" by the addition of more dissolved nutrients. In effect, Zeolites increase nutrient retention, reduce environmental nutrient losses and reduce fertilizer requirements by establishing a replenishable and balanced nutrient supply in the plant root zone.

Accordingly, the zeolite has a plurality of air through channels formed on an outer circumferential surface thereof wherein each of the air through channels has a size approximately $10^{-6}$ µm. According to the physical properties, one of the most important factors for enhancing the chemical reaction is the surface area of the reactant. Since the zeolite has a plurality of air through channels, the surface area of the zeolite will be substantially increase to enhance the chemical reaction of the zeolite.

The following examples demonstrate the use of the nano diatomite and zeolite ceramic crystal powder of the present invention.

The nano diatomite and zeolite ceramic crystal powder of the present invention can be used in agriculture or horticulture. The diatomite and zeolite are mixed with ceramic powder adapted for emitting far infra red and water base adhesive substance wherein the diatomite, the zeolite, the ceramic powder and the water base adhesive substance are at a weight ratio 5:2:1:2. The diatomite, the zeolite, the ceramic powder and the water base adhesive substance are mixed with each other to form a nutrient retention medium having a pellet form in diameter of approximately 1 to 5 millimeter.

As shown in FIG. 1, in order to manufacture the nano diatomite and zeolite ceramic crystal powder as a plant growth medium, the present invention further comprises the steps of:
 (1) Heat the nutrient medium at a predetermined temperature in a range of 50 to 80° C. until the nutrient medium contains 5 to 10% water by weight.
 (2) Ionize the nutrient medium at a predetermined temperature approximately 1000° C. within a predetermined time approximately 40 minutes.
 (3) Add a predetermined amount of ammonia aqua into the nutrient medium until the pH value thereof is neutral (approximately pH value of 7 to 8).

In step (3), the ammonia aqua is added into the nutrient medium having a temperature approximately 50 to 60° C. wherein the nutrient medium is then cooled down to reach the room temperature so as to form the plant growth medium. Therefore, the plant growth medium of the nano diatomite and zeolite ceramic crystal powder can be packed in a vacuum manner.

Accordingly, before the step (3), the present invention further comprises a step of adding nitrogenous fertilizer into the nutrient medium.

It is worth to mention that since the diatomite has a capability of retaining water in such a manner that when the nano diatomite and zeolite ceramic crystal powder is added into the soil, the nano diatomite and zeolite ceramic crystal powder is capable of maintaining the moisture level of the soil so as to prevent the water loss of the soil to keep the plant growing. Accordingly, the nano diatomite and zeolite ceramic crystal powder of the present invention can at least 50 to 70% of water. Moreover, the diatomite can remove the microbial contaminants in soil so as to keep the plant in a healthy condition and the environment clean.

In addition, the zeolite not only increases nutrient retention but also achieves the slow release process of nutrient for gradually releasing the nutrient to the plant so as to reduce environmental nutrient losses of the soil by means of the ion exchange ability. Therefore, the natural environmental materials of the diatomite and the zeolite are mixed to be the plant growth medium for agriculture to increase crop yields.

Another application of the present invention is used as an environment cleaner. The nano diatomite and zeolite ceramic crystal powder is adapted to attach on a foam material to form an air filtering layer wherein the ceramic crystal powder and the foam material are at a weight ratio 3:7 or 2:8. The air filtering layer can be used at an air outlet of an air conditioning system for removing the microbial contaminants and dangerous isotopes, so as to remove the bad odor in the air.

It is worth to mention that when active gas molecule is added into the nano diatomite and zeolite ceramic crystal powder of the present invention, the zeolite can gradually release oxygen by the ion exchange process, so as to improve the quality of the air. Therefore, the nano diatomite and zeolite ceramic crystal powder can be formed as a home decoration, such as vase or statue, or mattress pad in such a manner that the nano diatomite and zeolite ceramic crystal powder can remove the bad odor and ionized the air as a household odor control or pet odor control to keep the air clean. Accordingly, 1 $cm^3$ of the nano diatomite and zeolite ceramic crystal powder is capable of efficiently functioning within a space of 10,000 $cm^3$ for at least 5 years.

Thus, another application of the present invention is the water treatment in the water system such as aquaculture. For example, when the present invention is used in the aquarium, the nano diatomite and zeolite ceramic crystal powder not only remove the heavy metal in the water through the ion exchange process and the microbial contaminants so as to remove the bad odor of the water but also produce oxygen to improve the quality of the water.

The nano diatomite and zeolite ceramic crystal powder is adapted to apply as a body dressing containing positively charged ions for depolarizing the negatively charged ions in a treating tissue around the sweat gland.

It is worth to mention that the skin diseases, such as armpits odor, pimple, leuconychia, or athlete's foot, is caused by fungus. Practically, the fungus can only grow under a condition that the sweat gland has a negative electric signal. In other words, the negative ions around the sweat gland will enhance the growth of the fungus.

Accordingly, the nano diatomite and zeolite ceramic crystal powder of the body dressing is preferably mixed with an oxidized metallic powder containing positively charged ions, such as copper oxide, and a permeating material to create an ion passway between the skin in contact with the body dressing and the treating tissue so as to enhance the depolarization of the positively charged ions of the body dressing with the negatively charged ions in the treating tissue of the sweat gland. The permeating material is preferably aluminum oxide adapted for producing far infrared as the ion passway to communicate with the treating tissue.

Billions of positively charged ions are loaded in the body dressing of the present invention, which is hundred or even thousand times more than the negative ions generally existed at the tissues to be treated. Therefore, when the negative ions at the treating tissues is depolarized, tissue cells become normal and no electric charge is around the sweat gland, so that the fungus will be inevitably killed in the sweat gland under the neutralized condition of the tissue cells therearound.

Furthermore, the nano diatomite and zeolite ceramic crystal powder can be used as a medical product wherein the nano diatomite and zeolite ceramic crystal powder is capable of mixing with medication in such a manner that the medicinal substance in the medication can be gradually permeated to the human body, so as to extend the treatment period of medication. The medication is preferably mixed the nano diatomite and zeolite ceramic crystal powder for dyspepsia or flatulence.

Figure 2:
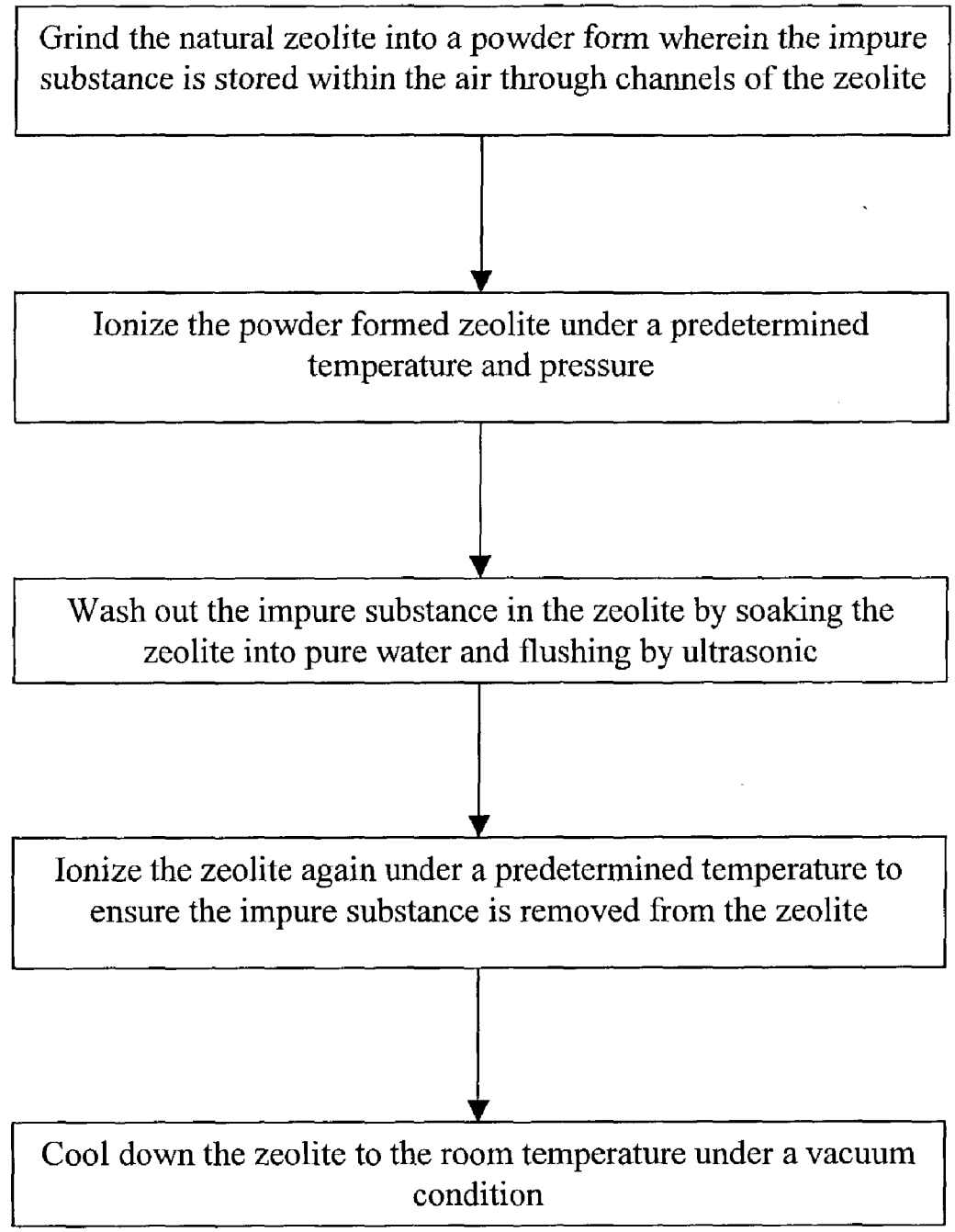
FIG. 2 is a flow diagram illustrating a cleaning process of the zeolite of the ceramic crystal powder according to the above preferred embodiment of the present invention.

As shown in FIG. 2, the zeolite must be treated in order to mix with the diatomite, wherein the treating process of the zeolite comprises the steps of:
- (A) Grind the natural zeolite into a powder form wherein the impure substance is stored within the air through channels of the zeolite.
- (B) Ionize the powder formed zeolite under a predetermined temperature and pressure.
- (C) Wash out the impure substance in the zeolite.
- (D) Ionize the zeolite again under a predetermined temperature to ensure the impure substance is removed from the zeolite.
- (E) Cool down the zeolite to the room temperature under a vacuum condition.

In step (A), since the zeolite is a natural environmental material there are many impure substance, such as gas or fungus trapped within the air through channels of the zeolite when the natural zeolite is found. Therefore, in order to clean up the zeolite, the zeolite is preferred to be grinded into the powder form for enhancing the cleaning process.

In step (B), the zeolite is heat up at a temperature in a range from 300° C. to 500° C. under the atmospheric pressure (1 atm) in such a manner that the gas within the air through channels is released and the fungus are killed under the temperature. Moreover, after the step (B), the zeolite is preferred to be cooled down to the room temperature before the step (C) is performed.

Accordingly, in step (C), the zeolite is soaked into pure water and flushed by ultrasonic, preferably two times. Since there is no impure substance in the pure water, the zeolite will not be polluted such that the zeolite is safe to be cleaned by the pure water. Thus, the ultrasonic can effectively flush out the impure substance in the air through channels of the zeolite without damaging the structure thereof, so that the impure substance can be dissolved in the pure water.

The step (C) further comprises a sub-step of filtering the zeolite from the pure water such that the impure substance in the pure water can be removed from the zeolite.

In step (D), the zeolite is then ionized again wherein the zeolite is heated up at a temperature approximately 300° C. to 500° C. to ensure the gas and water are removed from the air through channels of the zeolite.

Since the cleaned zeolite is started to react with the air, the zeolite must be cooled down in the vacuum condition in the step (E). When the temperature of the zeolite reaches the room temperature, the zeolite is arranged to be packed in a vacuum tight manner so as to ensure no reaction is occurred between the zeolite and the air before the use of the zeolite.

In addition, the nano diatomite and zeolite ceramic crystal powder of the present invention has the span of service life at least 5 to 20 years such that the user does not have to replace the nano diatomite and zeolite ceramic crystal powder of the present invention until the nano diatomite and zeolite ceramic crystal powder of the present invention is saturated. It is worth to mention that when the nano diatomite and zeolite ceramic crystal powder is saturated, the air through channels are occupied by the active gas molecule during the chemical reaction such that no reaction can be further occupied with the nano diatomite and zeolite ceramic crystal powder. However, the zeolite can be treated to clean the air through channel through the cleaning process as mentioned above so that the present invention be recycled in use.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A method of manufacturing a plant growth medium, comprising the steps of:
   - (a) mixing powder of diatomite, powder of zeolite, ceramic powder and water base adhesive substance to form a nutrient retention medium;
   - (b) heating said nutrient medium at a temperature effective to achieve a nutrient medium containing 5 to 10% water by weight;
   - (c) ionizing said nutrient medium at 1000° C. for 40 minutes; and
   - (d) adding ammonia water into said nutrient medium until the pH value of said nutrient medium reaches a range from 7 to 8.

2. The method as recited in claim 1, in step (a), wherein said diatomite, said zeolite, said ceramic powder and said water base adhesive substance are at a weight ratio 5:2:1:2.

3. The method as recited in claim 1, before step (c), wherein said treating process further comprises a step of adding nitrogenous fertilizer into the nutrient medium.

4. The method as recited in claim 2, before step (c), wherein said treating process further comprises a step of adding nitrogenous fertilizer into the nutrient medium.

5. The method as recited in claim 4, before step (a), wherein said zeolite is treated by a cleaning process which comprises the steps of:
   - (a1) grinding said zeolite into a powder form wherein an impure substance is stored within air through channels of said zeolite;
   - (a2) ionizing said powder formed zeolite at a temperature in a range from 300° C. to 500° C. under atmospheric pressure (1 atm);
   - (a3) washing out said impure substance in said zeolite;
   - (a4) ionizing said zeolite again at a temperature in a range from 300° C. to 500° C. to ensure said impure substance being removed from said zeolite; and
   - (a5) cooling down said zeolite to room temperature.

6. The method as recited in claim 5, in step (a5), wherein said zeolite is stored and packed in a vacuum environment to prevent a reaction between said zeolite and the air.

7. The method as recited in claim 5, in step (a3), wherein said zeolite is soaked in pure water and flushed by ultrasonication.

* * * * *